United States Patent [19]
Robins

[11] 3,907,706
[45] Sept. 23, 1975

[54] LATENT CATALYST SYSTEMS FOR CATIONICALLY POLYMERIZABLE MATERIALS
[75] Inventor: Janis Robins, St. Paul, Minn.
[73] Assignee: Minnesota Mining and Manufacturing Company, St. Paul, Minn.
[22] Filed: July 6, 1973
[21] Appl. No.: 377,026

[52] U.S. Cl. ............ 252/431 C; 252/428; 252/430; 252/431 P; 260/2 EC; 260/47 EC; 260/59 R; 260/59 EP; 260/37 EP; 260/47 A; 260/830 TW; 161/170; 117/126 GB; 117/126 GE
[51] Int. Cl.² .................... B01J 31/04; B01J 31/18; B01J 31/20
[58] Field of Search ............ 252/431 C, 431 P, 428, 252/430

[56] References Cited
UNITED STATES PATENTS
3,586,616  6/1971  Kropp ..................... 252/431 C X
3,632,843  1/1972  Allen ....................... 252/426 X Primary Examiner—Patrick P. Garvin
Attorney, Agent, or Firm—Alexander, Sell, Steldt & DeLaHunt

[57] ABSTRACT

A multi-component catalyst system that is latent at a first elevated temperature but is rapidly activated at a second temperature only slightly elevated over the first temperature comprises 1) metal salts of fluoroalkane sulfonic acids or bis(fluoroalkylsulfonyl)methanes, and 2) a thermally decomposable ester reaction product of a tertiary alkyl alcohol and an acid that forms a chelation complex with the metal ion of the metal salt. In some embodiments the catalyst system further includes a buffering compound that retards activity of the catalyst system.

12 Claims, No Drawings

LATENT CATALYST SYSTEMS FOR CATIONICALLY POLYMERIZABLE MATERIALS

BACKGROUND OF THE INVENTION

The balance between latency and reactivity exhibited by a curable resin composition often determines whether the composition can be hot-melt coated into a matrix of reinforcement, such as a web of collimated filaments, to form a prepreg. For a practical hot-melt coating operation, the resin composition must be sufficiently latent at the coating temperature to give the coating bath a long useful life, and yet the resin composition should cure rapidly at a temperature that is often only slightly elevated over the coating temperature. In addition, once impregnated into a prepreg, the resin composition must be latent under useful storage conditions, normally at room temperature, for at least several months.

This need for latency has prevented the use in prepregs of resin compositions that rely on the catalyzed homopolymerization of certain epoxy resins, such as certain cycloaliphatic epoxy resins, even though such epoxy-based resin compositions offer properties for a prepreg that are in demand and cannot otherwise be supplied. For resin compositions based on these epoxy resins to be hot-melt coated onto a web of collimated glass roving, they would have to be heated to 100°C in the coating bath and have a useful period of latency at that temperature; yet once impregnated into roving to form a prepreg tape, they would desirably cure rapidly at temperatures in the vicinity of 150°C.

There has been no catalyst system for the described epoxy resins that exhibited the desired latency at 100°C, rapid cure at 150°C, and long storage-stability. Availability of such a catalyst system for these epoxy resins, as well as for other cationically polymerizable materials, would significantly extend the usefulness of such materials, not only for prepregs, but for a wide-ranging set of uses.

SUMMARY OF THE INVENTION

Briefly, a catalyst system of the present invention comprises, in combination, 1. lithium, sodium, calcium, strontium, silver, barium, or lead salts of either a fluoroalkane sulfonic acid or a bis(fluoroalkylsulfonyl)methane;

2. thermally decomposable ester reaction product of a tertiary alkyl alcohol and an acid that forms a chelation complex with the metal cation of the metal salt; and 3. optionally, a buffering compound providing a base that will associate with the proton of the chelating acid of the ester reaction product to form a weak acid that is not a catalyst for the materials being catalyzed by the catalyst system. This catalyst combination is introduced into the polymerizable system in typical catalyst amounts, in which it is soluble in the system. Generally, about 0.5 to 2 equivalents of the ester reaction product are included per equivalent of the salt, and up to about 0.6 equivalent of buffering compound are included per equivalent of ester reaction product.

For convenience herein, salts as described above are called "fluoroalkylsulfonyl salts" and the corresponding acids are called "fluoroalkylsulfonyl acids" (the bis(fluoroalkylsulfonyl)methanes are regarded as acids herein since they contain an acidic proton); and the ester reaction products described above are called "acid-generating esters," or sometimes, more simply, "activators."

Upon heating to a known elevated temperature, the catalyst combination is activated by an interaction of the component parts. In this interaction, fluoroalkylsulfonyl acid is released, apparently as a result of removal of the metal cation of the fluoroalkylsulfonyl salt from the solution through a chelation reaction in which the acid provided by thermal decomposition of the acid-generating ester complexes with the metal cation. A polymerizable system of the invention generally remains quite latent until the activation temperature is reached, whereupon the catalyst combination activates and within a short time achieves a high degree of polymerization of the system. In some preferred embodiments, the catalyst combination is latent for a period of time after it reaches the activation temperature, but once activated, rapidly initiates a high degree of cure.

The base provided by the buffering compound included in some catalyst combinations of the invention associates with the proton of the chelating acid as it is generated by the acid-generating ester to form a weak acid that is not a catalyst for the polymerizable materials in the system and thereby retards catalytic activity. Once the base provided by the buffering compound is exhausted, the proton of the chelating acid associates (in ionized form) with the fluoroalkylsulfonyl radical from the metal salt to form the strong acid that is a catalyst for the polymerizable materials. The proton from the chelating acid associates with the base from the buffering compound in preference to associating with the fluoroalkylsulfonyl radical from the metal salt because of the superior basicity of the base of the buffering compound.

A catalyst combination of the invention offers a balance of latency and reactivity—including long-storage-stability, latency at elevated temperatures, and rapid reactivity at slightly further elevated temperature—that makes possible for the first time the satisfactory use of certain epoxy resins for hot-melt coating into prepregs. As an example, some resin compositions including a catalyst combination of the invention are stable, that is, do not double in viscosity, for at least one-half hour, and in preferred embodiments are stable for at least 3 hours, when heated to 100°C. Yet when heated to a temperature slightly above the temperature of latency, these same resin compositions rapidly react to a cured condition, exhibiting, for example, a gel-time of less than 30 minutes after heating to 150°C, and in preferred embodiments, a gel-time of less than 10 minutes after heating to 150°C. And even after being heated to 100°C to melt and impregnate them into a matrix of reinforcement and then cooled to room temperature, they retain a long storage-stability, some of them having been stable for several months without showing any reduction in surface tack, for example.

A concomitant advantage is that catalyst combinations of the invention can be made to initiate curing at temperatures that are low in comparison to the temperature of reaction initiated by some previous catalysts. And the temperature at which activation is to occur may be controlled by properly choosing the ingredients. Another advantage of catalyst combinations of the invention is that they form moisture-resistant cured products, which many other potential catalyst systems don't do. In addition, catalyst combinatons of the invention are soluble in a wide range of polymerizable materials, giving them a wide utility.

A catalyst combination of the invention is generally useful with any polymerizable material in which it is soluble and whose polymerization is catalyzed by the fluoroalkylsulfonyl acid released by the catalyst combination. A typical class of polymerizable materials comprises cationically sensitive materials, in which attack by a cation initiates polymerization of the material. These materials will be called cationically polymerizable materials in this specification.

PRIOR ART

U.S. Pat. No. 3,632,843 provided the first disclosure of bis(perfluoroalkylsulfonyl)methanes as rapid-acting catalyst for cationic sensitive monomers. In the course of that disclosure, the patent suggested use of amino or ammonium salts of such acids as latent catalysts, and suggested that initiation of catalysis by those latent salts might, as one alternative, be obtained through use of latent accelerators such as esters of strong acids, that are heated to initiate the catalysis.

While such a catalyst system would involve use of an acid like one of those used in the invention described herein, that prior system would not provide latency of the same order as the latency obtained with a catalyst combination of the present invention. The prior catalyst combinations would be activated at lower temperatures than those of the present invention, and they would not provide the sharp conversion from latency to activity provided by the present invention.

Metal salts of fluoroalkane sulfonic acids and bis(fluoroalkylsulfonyl)methanes have also been previously disclosed and noted to be latent catalyst. U.S. Pat. application, Ser. No. 336,939, now U.S. Pat. No. 3,842,019 discloses salts of fluoroalkane sulfonic acids as latent catalysts for cationically sensitive monomers, while U.S. Pat. No. 3,347,676 discloses photopolymerizable compositions that include a photoinitiator that comprises combinations of a halide promoter and silver or thallium salt of perfluoroalkane sulfonic acids. And U.S. Pat. No. 3,586,616 discloses metal salts of bis(fluoroalkylsulfonyl)methanes as latent catalysts.

However, the previously described metal salts have generally either been much too active or much too latent by themselves for the uses to which catalyst combinations of the invention are put. And catalyst systems initiated by exposure to light are not useful in the many situations where reaction is to occur in a closed environment, such as in a mold or where a laminated product of several thin layers is to be prepared, or where the polymerizable system may contain opacifying pigments.

None of these items of prior art resulted in a catalyst that would satisfy the stringent requirements necessary to permit satisfactory use of certain epoxy resins in prepregs, as well as satisfy the requirements for a wide-ranging set of other uses.

DETAILED DESCRIPTION

METAL SALTS

As previously noted, the soluble metal salts used in catalyst systems of the present invention are made from two general classes of fluoroalkylsulfonyl acid: fluoroalkane sulfonic acids and bis(fluoroalkylsulfonyl)methanes. These acids are strong acids, generally having a pKa of less than zero, and preferably less than −2 or even −5. Of these two classes, salts of the fluoroalkane sulfonic acids are preferred because they are effective in lesser amounts and provide a more sharp change from latent to active.

The salts of these fluoroalkylsulfonyl acids may be represented by the following formulas: for the salts of fluoroalkane sulfonic acid, $(R_fSO_3)_n$ M; and for the salts of bis(fluoroalkylsulfonyl)methane,

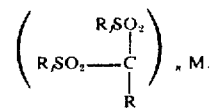

In these formulas, $n$ is 1 or 2; $R_f$ is a fluorinated alkyl; M is selected from lithium, sodium, calcium, strontium, silver, barium and lead, preferably lithium, sodium, strontium, or barium, and even more preferably barium; and R may be a wide variety of substituent groups that do not prevent the desired acidity, including H, Br, Cl, alkyl having 1 to 19 carbons, aryl, alkaryl; or R'-Y, where R' is an alkylene linking group (preferably methylene or ethylene) and Y is —OH, —CH=CH$_2$, —COOH, Br, Cl, or —O—C(O)—C(R'')=CH$_2$, where R'' is H or —CH$_3$ : or $R_fSO_2$.

By fluorinated alkyl, it is meant herein a fluorinated, saturated, monovalent, non-aromatic, aliphatic radical that is straight, branched, or cyclic and has a backbone of carbon-to-carbon linkages. A fully fluorinated group is preferred, but hydrogen or chlorine atoms may be present as substituents in the fluorinated aliphatic radical provided that not more than one atom of either is present in the radical for every two carbon atoms and that the radical contains at least a terminal perfluoromethyl grop. The fluorinated aliphatic radical generally contains not more than 20 carbon atoms, preferably contains less than 8 carbon atoms, and more preferably contains one or two carbon atoms.

Illustrative of the useful fluoroalkane sulfonic acids are $CF_3SO_3H$ (the preferred sulfonic acid in this invention), $C_2F_5SO_3H$, $C_3F_7SO_3H$, $(CF_3)_2CFSO_3H$, $C_4F_9SO_3H$, $C_6F_{13}SO_3H$, $C_8F_{17}SO_3H$, $C_{11}F_{23}SO_3H$, $CF_3C_6F_{10}SO_3H$, $(CF_3)_2CF(CF_2)_4SO_3H$, $C_2HF_4SO_3H$, $C_3F_7CHFCF_2SO_3H$, $(CF_3)_2CHCF_2SO_3H$, $C_4F_9CFHCF_2SO_3H$, $C_3H_7CH(CF_3)CF_2SO_3H$, $C_5H_{11}CHFCF_2SO_3H$, $C_7F_{15}CHFSO_3H$ and the like. Illustrative of the bis(fluoroalkylsulfonyl)methanes are $(CF_3SO_2)_2CH_2$, $(CF_3SO_2)_2CHCl$, $(CF_3SO_2)_2CHBr$, $(CF_3SO_2)_2CHCH_2C_6H_5$, $(CF_3SO_2)_2CHCH_2CH=CH_2$, $(CF_3SO_2)_2CHCH_2CH(Br)C_6H_{13}$, $(CF_3SO_2)_2CHCH_2CH_2OH$, $(CF_3SO_2)_23$, $(C_4F_9SO_2)_2CH_2$, $(C_4F_9SO_2)_2CHBr$, $(C_4F_9SO_2)_2CHC_6H_5$, $(C_4F_9SO_2)_2CHCH_2CH_2OH$, $(C_8F_{17}SO_2)_2CH_2$, $(C_8F_{17}SO_2)_2CHCL$, $(C_8F_{17}SO_2)_2CHCH_2CH=CH_2$, $(C_8F_{17}SO_2)_2CHBr$, $CF_3SO_2—CH_2—SO_2C_8F_{17}$, $CF_3SO_2—CH(Br)—SO_2C_8F_{17}$, $CF_3SO_2—CH(Br)—SO_2C_4F_9$, $C_4F_9SO_2—CH(Br)—SO_2C_8F_{17}$, $(CF_3SO_2)_2CHCH_2CH(Br)CH_2CH_2Cl$, $(CF_3SO_2)_2CHCH_2CH(Br)(CH_2)_5CH_3$, $(CF_3SO_2)_2CHCH_2CH(Br)CH_2COOH$, $(C_4F_9SO_2)_2CHCH_2CH_2OOCCH=CH_2$, $(C_4F_9SO_2)_2CHCH_2CH_2OOCC(CH_3)=CH_2$, $(C_4F_9SO_2)_2CH[CH_2CH(CH_3)O]_7H$, and $(CF_3SO_2)_3CH$.

The metal salts are prepared by simply reacting the fluoroalkylsulfonyl acid with an oxide, hydroxide, or carbonate of a metal in accordance with procedures well known in the art. For example, trifluoromethanesulfonic acid, $CF_3SO_3H$, dissolved in a solvent such as benzene may be reacted with barium carbonate by stirring the dissolved acid with a suspension of the barium carbonate, filtering the resulting mixture, and evaporating the filtrate to dryness to form barium trifluoromethane sulfonate, $Ba(CF_3SO_3)_2$.

ACID-GENERATING ESTERS

In general, the ester reaction products useful in the invention are soluble compounds which upon heating, preferably to a temperature of 150°C or more, decompose to release the chelating acid. Since the released acid forms a nonionizing chelation complex with the metal atom, the chelation reaction tends to remove metal atoms from a solution of the fluoroalkylsulfonyl salt. Thereupon the fluoroalkylsulfonyl acid is released for reaction to catalyze polymerization of the polymerizable material in the system.

The ester reaction product useful in the catalyst combinations of the invention are made from tertiary alkyl alcohols, since if nontertiary alcohols were used, the temperatures for decomposition of the ester reaction product to release the chelating acid would tend to be too high. Also, the hydrolytic stability of esters of some nontertiary alcohols is so low that a low level of moisture would cause premature reaction of the polymerizable system. Any tertiary alkyl alcohol that forms an ester reaction product with an appropriate acid may be used. Examples of suitable tertiary alkyl alcohols are t-butanol, 1,1-dimethylpropanol, 1-methyl-2-ethylpropanol, 1,1-dimethyl-n-butanol, 1,1-dimethyl-n-pentanol, 1,1-dimethylisobutanol, 1,1,2,2-tetramethylpropanol, 1-methylcyclopentanol, 1-methylcyclohexanol, 1,1-dimethyl-n-hexanol, 1,1-dimethyl-n-octanol, 1,1-diphenylethanol, and 1,1-dibenzylethanol.

The chelating acids that are the other component of the ester reaction product may be chosen by a simple test that shows their ability to form a chelate with the metal of the fluoroalkylsulfonyl salts in the catalyst system. In this test 0.002 mole of the fluoroalkylsulfonyl salt to be used in the catalyst combination is first dissolved in a mixture of 40 ml acetone and 10 ml water, after which the pH of the solution is adjusted to 7 (by adding trifluoromethane sulfonic acid or barium hydroxide, for example). Then 0.005 mole of the chelating acid is added and the ssytem allowed to equilibrate (generally within one hour). For the chelating acid to be useful in the invention, the pH of the equilibrated system should generally be less than about 2.

The preferred chelating acids for inclusion in acid-generating esters of the invention are oxalic, phosphoric and phosphorous acids. Other illustrative chelating acids that are useful include, polycarboxylic acids, e.g., malonic, succinic, fumaric, maleic, citraconic, aconitic, o-phthalic, trimesic acids and other polycarboxylic acids having less than 3 carbon atoms separating carboxylic groups, hydroxycarboxylic acids, e.g., glycolic, lactic, beta-hydroxybutyric, gamma-hydroxy-butyric, tartronic, malic, oxalacetic, tartaric, and citric acids; aldehydic and ketonic acids, e.g., glyoxylic, pyruvic, and acetoacetic acids; thioacids, e.g., mercaptoacetic, alpha-mercaptopropionic, beta-mercaptopropionic, thiooxalic, and mercaptosuccinic acids; other acids of phosphorous, e.g. hypophosphorous, and thiophosphoric acids; chromic acid; and vanadic acid.

The acid-generating esters may be prepared by procedures well known in the art. For example, acid-generating esters that incorporate the organic acids may be prepared by procedures described by G. J. Karabatsos, J. M. Corbett, and K. L. Krumel, J. Org. Chem. 30, 689 (1965). Esters that incorporate phosphate, phosphonate and phosphite esters can be prepared by procedures described by J. R. Cox, Jr., and F. H. Bestheimer, J. Am. Chem. Soc. 80, 5441 (1958); H. G. Goldwhite and B. C. Saunders, J. Chem. Soc. 2409 (1957); and J. R. Cox, Jr. and M. G. Newton, J. Org. Chem. 54, 2600 (1969) respectively.

The acid-generating ester should be relatively nonhydrolyzable and is typically neutral, that is, has a pH of 6-7. To remove traces of acid from the acid-generating ester, it may be passed through a column filled with an ion exchange resin.

Although applicant does not wish to be bound to a certain theory, the mechanism by which chelating acid is generated from the acid-generating ester is probably in accordance with the following chemical equation in which di(t-butyl) oxalate is exemplified as the acid-generating ester:

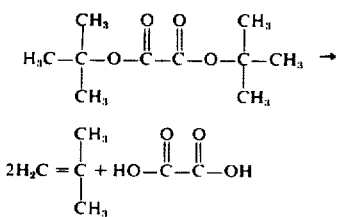

From this equation it is seen that the acid-generating ester (di(t-butyl) oxalate), upon heating, yields olefin (isobutylene) and a chelating acid (oxalic acid). This decomposition of the ester itself is self-catalytic, since the oxalic acid released in the reaction catalyzes further decomposition of the ester. Accordingly, release of chelating acid, and the consequent release of fluoroalkylsulfonyl acid and reaction of the polymerizable system, occurs very rapidly once it begins.

Depending on the nature of the olefin that is formed from the acid-generating ester that is used, blown or solid polymerization products may be obtained. Generally, solid, unfoamed polymerization products are obtained when the olefin formed has a boiling point of at least about 70°C and preferably at least 150°C at atmospheric pressure, while blown or foamed polymerization products are obtained when the olefin formed has a boiling point of less than about 70°C. Acid-generating esters derived from tertiary alcohols having g6 or more carbon atoms generally give olefins having a boiling point of at least 70°C, and tertiary alcohols having 9 or more carbon atoms generally give olefins having a boiling point of at least about 150°C.

BUFFER COMPOUNDS

In general, the buffer compounds that are used in some catalyst combinations of the invention to achieve a desired balance between latency and reactivity are basic compounds having a solubility in the whole composition of at least about 1 part by weight per 1000 parts by weight of the whole composition. As previously noted, upon solution in the material to be catalyzed, these compounds provide a base that reacts with the proton of the chelating acid to form a weak acid that does not catalyze polymerization of the polymerizable material in the system and thereby retard catalytic activity of the catalyst combination.

One simple test that will generally indicate the usefulness of a buffering compound in a catalyst combination of the invention is a test measuring the change in pH caused by adding of the buffering compound to an acidic solution. For example, such a test may be conducted by adding sufficient trifluoromethylsulfonic acid to 50 ml of a solvent mixture comprising 20 weight-percent water and 80 weight-percent acetone to produce a pH of 2. The buffereing compound being tested is then added to the solution in an amount of 0.001 base-equivalent. If the solution achieves a pH of 3 or greater, and preferably 5 or greater, in this test, the tested compound will generally be a useful buffering compound for inclusion in a catalyst combination of the invention.

Among the buffering compounds that may be used in the invention are 1) alkali-metal hydroxides, alkoxides, phenoxides, alkythioxides and enolates, such as sodium, potassium, lithium, and cesium hydroxides; sodium and potassium methoxides; potassium ethoxide; sodium isopropoxide; potassium butoxide; potassium hexoxide; potassium dodecanoxide; sodium octadecanoxide; sodium phenoxide; potassium 4-t-butylphenoxide; disodium salt of 2,2-bis(4-hydroxylphenyl)propane sodium acetylacetonate; potassium acetylacetonate; and the like; 2) alkali-metal and alkaline-earth-metal salts of carboxylic and thiocarboxylic acids, such as potassium acetate; sodium propionate; potassium hexanoate; potassium decanoate; sodium, potassium, barium, calcium, magnesium, and strontium stearates; potassium ethyl xanthate; potassium dodecycl xanthate; and the like; and 3) tertiary acyclic and heterocyclic amines, quaternary ammonium hydroxides, and phosphines, such as tripropyl or triamyl amine; triethylene diamine; hexamethylene tetramine; 1-methylimidazole; benzyl trimethylammonium hydroxide and tetramethylammonium hydroxide; and the like.

Other useful buffer compounds include phenylmercuric acetate, lead stearate, silver stearate, cobalt stearate, zirconium stearate, zirconium acetylacetonate and chromium stearate.

Generally, the most preferred buffering compounds are the strong bases including the alkali-metal hydroxides, alkoxides, and carboxylates, alkaline-earth-metal carboxylates, and the quaternary ammonium hydroxides.

PROPORTIONS

The catalyst materials of the present invention are generally used in typical catalytic amounts. For example, the fluoroalkylsulfonyl salt is generally included in an amount between about 0.1 and about 5.0 weight-parts, and preferably between about 0.2 to about 2 weight-parts, per 100 weight-parts of the polymerizable material in the system. The use of less than 0.1 part of the fluoroalkylsulfonyl salt is generally ineffectual for obtaining the desired catalysis, and the use of more than five parts of the salt makes the desired latency difficult to obtain.

As to the acid-generating ester, generally one equivalent of the ester is used per equivalent weight of the fluoroalkylsulfonyl salt. However, the amount of acid-generating ester may be varied, generally from about 0.5 to 2 equivalents of the ester per equivalent of the fluoroalkylsulfonyl salt. For example, 1 weight-part (0.005 equivalent) to 4 parts (0.02 equivalent of di(t-butyl)oxalate and 2.18 weight-parts (0.01 equivalent) of barium trifluoromethanesulfonate provide a catalyst system of the invention suitable for use in 20 to 100 weight-parts of cationically polymerizable material.

As to the buffering compound, this compound is generally used in an amount up to 0.6 equivalent per equivalent of acid-generating ester. The preferred concentration of buffering compound is from 0.1 to 0.4 equivalent of buffering compound per equivalent of acid-generating ester. The use of more than the specified amounts of buffering compound tends to interfere with the polymerization of the polymerizable material.

CATIONICALLY POLYMERIZABLE MATERIALS

A first and principal class of cationically polymerizable materials that may be catalyzed according to the invention are compounds that polymerize by opening of a cyclic group, for example, compounds such as cyclic ethers, aziridines, lactones and lactams. A preferred class of this kind includes the glycidyl and beta-methylglycidyl ethers of bisphenol A (2,2-bis(4-hydroxy phenyl,) propane), phenol cresol, resorcinol, or hydroquinone; the glycidyl and beta-methylglycidyl ethers of alcohols such as methanol, ethanol, n-butanol, ethylene glycol, 1,4-butanediol, diethylene glycol, triethylene glycol, glycerine, trimethylolpropane, 2,2-bis(4-hydroxycyclohexyl)-propane and the like; the glycidyl and beta-methylglycidyl esters of carboxylic acids such as acetic, butyric, dodecanoic, stearic, succinic, adipic, o-, m-, and p-phthalic and trimellitic acids, and the like.

Other epoxy resins useful in the invention may be obtained by reaction of less than two moles of epichlorohydrin or beta-methylepichlorohydrin with one mole of a compound having more than one active hydrogen or by the reaction of epichlorohydrin with novolac resins. Illustrative of such materials are the diglycidyl ethers of dihydric phenols such as 2,2-bis(4-hydroxycyclohexyl) propane and the diglycidyl ethers of phenol formaldehyde resins.

Other cationically polymerizable materials that polymerize by a ring opening include ethylene oxide, propylene oxide, cyclohexene oxide, octylene oxide, styrene oxide, dicyclopentadiene dioxide, pivalolactone, propiolactone, and ethylenimine.

Another useful class of cationically polymerizable materials are materials that have an ethylenic unsaturation, including 1) olefins, such as isobutylene, propane, 1,3-butadiene, isoprene, 2-methyl-1-heptene, styrene, and vinyl cyclohexene; and 2) vinyl ethers, such as methyl vinyl ether, butyl vinyl ether, n-octyl vinyl ether, dodecyl vinyl ether and methoxy ethyl ether.

Another useful class of cationically polymerizable materials are phenolic resins such as phenolic resins taught in U.S. Pat. No. 3,485,797, which contain benzylic ether linkages and are unsubstituted in the para positions.

The invention is further illustrated by the following examples. All parts and percentages in the examples are by weight unless otherwise specified.

EXAMPLES 1 – 7

These examples illustrate various catalyst systems of the invention, each having a different metal salt of trifluoromethanesulfonic acid and the same acid-generating ester, namely di(t-butyl)oxalate, and compare the results obtained with those systems with results obtained when the acid-generating ester is omitted from the systems. The polymerizable material in the examples is cyclohexene oxide.

The period of latency—this is, the induction period—of the polymerization systems in the examples was measured by measuring the temperature rise after addition of acid-generating ester into the system. The induction period was regarded as that period of time during which the system rose 4°C from its initial temperature. To shorten the experiment, the induction period was measured from an initial temperature of 150°C, though at 100°C or 130°C catalyst systems of the invention exhibit substantially more latency. It has been found that generally an induction period of 60 seconds at 150°C for this polymerization system indicates that the system will exhibit an induction period of at least 60 minutes at 100°C, and usually much longer.

The degree of polymerization at 150°C was measured by the maximum heat rise observed after addition of acid-generating ester into the system while the system was at 150°C. A maximum heat rise of 45°C would generally indicate that complete polymerization occured during the period of time in which the maximum heat rise occured. A maximum heat rise of 30°C in this test indicates an acceptable degree of polymerization, since polymerization continues after the maximum heat rise has been obtained in this experiment; however a maximum heat rise of 35–40°C during the experiment is preferred.

The polymerization system was prepared and reacted in a 50-ml Ehrlenmeyer flask into which had been inserted a thermocouple attached by electric conductors to a time-temperature recorder, and which was heated by an oil bath maintained at a temperature of 150° ± 1°C. First, 30 parts of benzophenone (solvent) was melted in the flask and heated to 150°C, after which 5 parts of cyclohexene oxide was added to the flask and the mixture heated to 150°C. Thereupon the catalyst system was introduced into the mixture. In the first part of each of the examples, labeled (a) in Table I which follows, a complete catalyst system was introduced including 0.2 part of the salt listed in the table, 0.2 part of di(t-butyl)oxalate, and 0.2 part of barium neodecanoate as a buffering compound. In part (b) of the examples, the acid-generating ester was not added (induction period and maximum heat rise were measured after addition of the other components of the catalyst combination).

TABLE I

| Ex. No. | Salt | Induction Period (seconds) | Maximum Heat Rise (°C) | Time to Reach Maximum Heat Rise (seconds) |
|---|---|---|---|---|
| 1a | LiCF$_3$SO$_3$ | 55 | 41 | 75 |
| 1b | " | >600 | 0 | — |
| 2a | Sr(CF$_3$SO$_3$)$_2$ | 70 | 42 | 95 |
| 2b | " | >600 | 0 | — |
| 3a | Ca(CF$_3$SO$_3$)$_2$ | 80 | 41 | 120 |
| 3b | " | >600 | 0 | — |
| 4a | Ba(CF$_3$SO$_3$)$_2$ | 120 | 42 | 150 |
| 4b | " | >600 | 0 | — |
| 5a | NaCF$_3$SO$_3$ | 180 | 41 | 220 |
| 5b | " | >600 | 0 | — |
| 6a | Mn(CF$_3$SO$_3$)$_2$ | 20 | 38 | 70 |
| 6b | " | >600 | 0 | — |
| 7a | AgCF$_3$SO$_3$ | 60 | 30 | 100 |
| 7b | " | >600 | 1 | — |

EXAMPLES 8 – 13

These examples illustrate the use of a variety of acid-generating esters with a variety of fluoroalkylsulfonyl salts in the polymerization of cyclohexene oxide. For each numbered example, a certain acid-generating ester was used, with each lettered part of the example using a different metal fluoroalkylsulfonyl salt. The procedures for preparation and testing and the amounts for Examples 1 –7 were used, and barium neodecanoate was used as a buffering compound in each example. While some combinations in these examples do not show satisfactory results in polymerizing cyclohexene oxide, they provide satisfactory results with other polymerizable materials and other temperatures of use.

TABLE II

| Example No. | Acid-generating ester | (a) NaCF$_3$SO$_3$ (1) | (2) | (b) LiCF$_3$SO$_3$ (1) | (2) | (c) Ca(CF$_3$SO$_3$)$_2$ (1) | (2) | (d) Sr(CF$_3$SO$_3$)$_2$ (1) | (2) | (e) Ba(CF$_3$SO$_3$)$_2$ (1) | (2) |
|---|---|---|---|---|---|---|---|---|---|---|---|
| 8 | Di(2-methyl-4-phenyl-2-butyl)oxalate | 205 | 37 | 35 | 37 | 20 | 35 | 100 | 35 | 40 | 38 |
| 9 | Di(2-methyl-4-pivaloxy-2-pentyl)oxalate | 240 | 34 | 35 | 42 | 55 | 39 | 20 | 43 | 75 | 38 |
| 10 | Di(2-methyl-4-acetoxy-2-pentyl)oxalate | 7600 | 1 | 160 | 30 | 90 | 33 | 20 | 41 | 95 | 39 |
| 11 | Tri(t-butyl)phosphite | 170 | 6 | 10 | 13 | 25 | 35 | 5 | 41 | 35 | 30 |
| 12 | Tri(2-methyl-4-acetoxy-2-pentyl)phosphite | 600 | 1 | 600 | 1 | 80 | 32 | 35 | 27 | 250 | 25 |
| 13 | Tri(t-butyl)phosphate | 600 | 1 | 130 | 19 | 50 | 34 | 25 | 41 | 130 | 36 |

(1) The first column under each letter gives the induction period in seconds that is obtained for the acid-generating ester of each numbered example (2) The second column under each letter gives the maximum heat rise in °C that is measured for each acid-generating ester of each numbered example

EXAMPLES 14 – 18

These examples illustrate the use in catalyst combinations of the invention of acid-generating esters prepared from oxalic acid and a variety of different tertiary alcohols. The catalyst combinations were used with cyclohexene oxide and included 0.2 part barium trifluoromethane sulfonate, 0.2 part barium stearate, and 0.001 mole of the acid-generating ester. Tests were conducted as described in the previous examples. Although the combination including an acid-generating ester prepared from 1,1-diphenylethanol gave no latency at 150°C as shown in the table, systems using such an ester have a useful latency at 100°C.

TABLE III

| Example No. | Tertiary alcohol | Induction Period (seconds) | Maximum Heat Rise (°C) |
|---|---|---|---|
| 14 | 1,1-diphenyl ethanol | 0 | 40 |
| 15 | 1-methylcyclo pentanol | 30 | 40 |
| 16 | 3-methylheptanol-3 | 70 | 40 |
| 17 | t-butanol | 150 | 41 |
| 18 | 1-methylcyclo hexanol | 200 | 41 |

EXAMPLES 19 – 23

These examples illustrate the use in catalyst combinations of the invention of acid-generating esters prepared from a variety of chelating acids and the same tertiary alcohol. The catalyst combination in these examples included 0.2 part of barium trifluoromethane sulfonate and an acid-generating ester of the type and in the amount shown in the table below. The combination was used to polymerize cyclohexene oxide. The maximum heat rise occurring within three minutes after addition of the catalyst combination was measured at three different temperatures—110°C, 130°C, and 150°C—to show the variation in the degree of cure that occurs depending on the temperature of curing.

TABLE IV

| Ex. No. | Acid-Generating Ester | Parts | 3 Minute Heat Rise 110°C | 130°C | 150°C |
|---|---|---|---|---|---|
| 19 | Di(t-butyl) oxalate | 0.2 | 1 | 7 | 44 |
| 20 | Di(t-butyl) phosphonate | 0.2 | 3 | 35 | 46 |
| 21 | Tri(t-butyl) phosphite | 0.25 | 6 | 32 | 40 |
| 22 | Tri(t-butyl) phosphate | 0.26 | 3 | 38 | 45 |
| 23 | Tri(t-butyl) vanadate | 0.2 | 10 | 23 | 36 |

EXAMPLES 24 – 35

These examples illustrate the use of a variety of buffering compounds to increase the induction period provided by a catalyst combination of the invention. In the catalyst combinations of these examples, the fluoroalkylsulfonyl salt was 0.2 part of barium trifluoromethane sulfonate, the acid-generating ester was 0.4 part of di(-2-methyl-4-pivaloxy-2-pentyl) oxalate, and the buffering compound was 0.0005 base-equivalents of the compound given in Table V. The preparation and test procedures were as given in Examples 1 – 7.

TABLE V

| Example No. | Buffering Compound | Induction Period (seconds) | maximum Heat Rise (°C) |
|---|---|---|---|
| 24 | None | 10 | 40 |
| 25 | Sodium stearate | 270 | 40 |
| 26 | Barium stearate | 150 | 40 |
| 27 | Magnesium stearate | 40 | 39 |
| 28 | Silver stearate | 170 | 34 |
| 29 | Ferric octoate | 50 | 27 |
| 30 | Sodium acetylacetonate | 130 | 40 |
| 31 | Potassium acetylacetonate | 270 | 29 |
| 32 | Triethylene diamine | 130 | 33 |
| 33 | Trioctylphosphine | 120 | 26 |
| 34 | Benzyltrimethylammonium hydroxide | 420 | 22 |
| 35 | 1-Methylimidazole | 410 | 31 |

EXAMPLES 36 – 47

These examples illustrate the effect on induction period of increasing the amount of buffering compound in a catalyst system of the invention. In each of these examples, the fluoroalkylsulfonyl salt was barium trifluoromethane sulfonate. In Examples 36–41, 0.2 part di(t-butyl)oxalate was the acid-generating ester; in Examples 42, 43, 46, and 47, 0.5 part of di(2-methyl-4-pivaloxy-2-pentyl)oxalate was used; and in Examples 44 and 45, 0.4 part of di(2-methyl-4-pivaloxy-2-pentyl)oxalate was used. The buffering compound and amount were as given in Table VI. Otherwise the procedures were as given in Examples 1–7.

TABLE VI

| Ex. No. | Buffering Compound | Parts | Induction Period (seconds) | Maximum Heat Rise (°C) |
|---|---|---|---|---|
| 36 | None | | 10 | 27 |
| 37 | Barium neodecanoate | 0.1 | 90 | 42 |
| 38 | " | 0.2 | 170 | 42 |
| 39 | " | 0.4 | 300 | 39 |
| 40 | " | 0.6 | 300 | 39 |
| 41 | " | 0.8 | 420 | 22 |
| 42 | Potassium acetylacetonate | 0.04 | 50 | 40 |
| 43 | " | 0.07 | 270 | 29 |
| 44 | 1-Methyl-imidazole | 0.01 | 185 | 33 |
| 45 | " | 0.02 | 410 | 31 |
| 46 | Benzyltrimethyl-ammonium hydroxide | 0.03 | 130 | 39 |
| 47 | " | 0.08 | 500 | 22 |

EXAMPLES 48 and 49

These examples show the use of catalyst combinations based on silver and lead salts of bis(trifluoromethanesulfonyl) methane to catalyze polymerization of diglycidyl ethers of bisphenol A having an epoxide quivalent weight of 185-192 (Epon 828 from Shell Chemical Company). The polymerization system included 100 parts of the diglycidyl ether of bisphenol A, 1 part of the metal salt, 0.5 of di(benzyl-t-butyl)oxalate, and 0.5 part of barium neodecanoate. The ingredients were mixed at room temperature and then heated in an oven to three different temperatures. Gel time was measured at the three different temperatures.

TABLE VII

| Example No. | Metal Salt | Gel Time 50°C (hours) | Gel Time 100°C (hours) | Gel Time 150°C (minutes) |
|---|---|---|---|---|
| 48 | AgCH(SO$_2$CF$_3$)$_2$ | 200 | 1 | 11 |
| 49 | Pb[CH(SO$_2$CF$_3$)$_2$]$_2$ | 50 | 10 | 15 |

EXAMPLE 50

This example illustrates the use of the silver salt of bis(fluoromethylsulfonyl)methane in a catalyst combination of the invention to polymerize cyclohexene oxide. One part of the salt was used with 0.2 part of barium neodecanoate as buffering compound and 1 part of di(2-methyl-4-pivaloxy-2-pentyl)oxalate as acid-generating ester. The procedures and other amounts were as given in Examples 1–7. At 150°C the induction period was 5 seconds, the maximum heat rise was 35°C, and the time to maximum heat rise was 20 seconds. At 100°C, the polymerizable composition had a useful latency in excess of 10 minutes.

Examples 51 – 56

These examples illustrate the use in catalyst combinations of the invention of a variety of metal salts based on different fluoroalkane sulfonic acids. The polymerizable material in the examples was cyclohexene oxide; the salt and amount of the salt used in each example are given in the following table; the acid-generating ester was 0.2 part of di(benzyl-t-butyl)oxalate; and barium neodecanoate was used as a buffering compound in amounts as shown in the table. The procedures and other amounts were as given in Examples 1–7.

TABLE VIII

| Example No. | Metal Salt | Amount of Metal Salt (parts) | Barium neodecanoate (parts) | Induction Period (seconds) | Maximum Heat Rise (°C) | Time to Maximum Heat Rise (seconds) |
|---|---|---|---|---|---|---|
| 51 | LiCF$_3$SO$_3$ | 0.15 | | 10 | 37 | 60 |
| 52 | LiC$_8$F$_{13}$SO$_3$ | 0.44 | | 10 | 37 | 50 |
| 53 | ″ | ″ | 0.2 | 150 | 34 | 210 |
| 54 | LiC$_8$F$_{17}$SO$_3$ | 0.51 | | 20 | 37 | 60 |
| 55 | LiC$_2$F$_5$(C$_8$F$_{10}$)SO$_3$ | 0.47 | 0.2 | 90 | 37 | 120 |
| 56 | Ca(C$_8$F$_{17}$SO$_3$)$_2$ | 0.52 | 0.2 | 180 | 32 | 300 |

EXAMPLES 57 – 60

These examples illustrate use of catalyst combinations of the invention with different epoxy compounds and at different temperatures. In these systems, the catalyst combination included barium trifluoromethane sulfonate (0.2 part), di(benzyl-t-butyl)oxalate (0.4 part), and barium neodecanoate (0.1 part). In Example 57, the epoxy compound was cyclohexene oxide; in Example 58, glycidol; in Example 59, phenyl glycidyl ether; and in Example 60, glycidyl methacrylate. The procedures were generally the same as used in the previous examples, except that induction period and maximum heat rise were measured at both 150°C and 170°C.

TABLE IX

| Example No. | 150°C Induction Period (seconds) | 150°C Maximum Heat Rise (°C) | 170°C Induction Period (seconds) | 170°C Maximum Heat Rise (°C) |
|---|---|---|---|---|
| 57 | 60 | 41 | 10 | 44 |
| 58 | 150 | 29 | 20 | 43 |
| 59 | 260 | 10 | 70 | 44 |
| 60 | 260 | 8 | 40 | 9 |

Although the glycidyl methacrylate showed an unacceptable degree of curing at 170°C in this series of experiments, catalyst combinations of the invention using other activators, such as di(t-butyl)phosphonate, were added to glycidyl methacrylate to prepare systems that were latent at 100°C but that rapidly reacted to an almost completely polymerized state at 170°C.

EXAMPLES 61 and 62

These examples illustrate the use of a catalyst combination of the invention mixed with cycloaliphatic epoxy resins to provide a resin composition useful to impregnate into prepreg articles and having a long pot life.

A mixture of 40 parts of a first cycloaliphatic epoxy resin (3,4-epoxycyclohexylmethyl-3,4-epoxycyclohexane carboxylate available as ERL 4221 from Union Carbide Company) and 60 parts of a second cycloaliphatic epoxy resin (a solid reaction product of the first epoxy resin with hexahydrophthalic anhydride, available as ERRA 4211 from Union Carbide Company) were heated to about 100°C. The induction period for the composition was then initiated by adding a catalyst combination of the invention to the melt while the melt was maintained at about 100°C. In Example 61 the catalyst combination consisted of 0.5 part of barium trifluoromethylsulfonate and 0.5 part of di(-2-methyl-4-pivaloxy-2-pentyl)oxalate. In Example 62 the catalyst system used the same salt and used di(2-methyl-4-acetoxy-2-pentyl)oxalate as the acid-generating ester. The induction period or pot life of the compositions was determined by measuring the time for the viscosity of the mixture (measured at 100°C in a Brookfield viscosimeter) to reach 3000 centipoises; and reactivity of the compositions was determined by measuring the gel time for the compositions at 163°C (measured by a Sunshine Gelometer manufactured by Sunshine Scientific Instruments). The results are recorded in Table X.

TABLE X

| Example No. | Acid-Generating Ester | Gel Time at 163°C (minutes) | Pot Life at 100°C (minutes) |
|---|---|---|---|
| 61 | Di(2-methyl-4-pivaloxy-2-pentyl)oxalate | 3.6 | 170 |
| 62 | Di(2-methyl-4-acetoxy-2-pentyl)oxalate | 5 | 216 |

EXAMPLES 63 and 64

These examples illustrate the use of a buffering compound in the catalyst combination described in Example 61 to prolong the pot life of the composition. In Example 63, 0.2 part of sodium stearate was included in the catalyst combination of Example 61, and in Example 64, 0.2 part of barium neodecanoate was included. The gel time of the compositions at 163°C and the pot life of the compositions (time to reach 3000 centipoises at 100°C) are given in Table XI.

TABLE XI

| Example No. | Buffering Compound | Gel Time at 163°C (minutes) | Pot Life at 100°C (minutes) |
|---|---|---|---|
| 63 | Sodium stearate | 4.4 | >240 |
| 64 | Barium neodecanoate | 3.6 | >240 |

EXAMPLES 65 – 67

These examples compare the shelf life of cycloaliphatic epoxy compositions containing a catalyst combination of the invention with the shelf life of cycloaliphatic epoxy compositions containing standard catalysts.

In each of the examples, the catalyst combination described in Table XII was added to 100 parts of molten composition as described in Example 61 and was at 100°C. The mixture was then coated onto a web of glass roving, cooled to room temperature (about 25°C), and allowed to stand. The shelf life was taken as that time that the coated web remained tacky to the touch.

TABLE XII

| Ex. No. | Catalyst Combination | Shelf Life (days) |
|---|---|---|
| 65 | 0.2 part barium trifluoromethylsulfonate and 0.2 part di(2-methyl-4-pivaloxy-2-pentyl)oxalate | >150 |
| 66 | Methyl Nadic Anhydride sufficient to give a carboxy:epoxy ratio of 2.0 and 0.5 part Argus DB VIII (from Argus Chemical Co.) | 10 |
| 67 | Methyl Nadic Anhydride sufficient to give a carboxy:epoxy ratio of 1.6 and 0.5 part CuSO$_4$(Im)$_4$ | 10 |

EXAMPLE 68

This example illustrates the preparation of a glassfiber-reinforced prepreg tape impregnated with resin composition that consisted of cycloaliphatic epoxy resin and a catalyst combination of the invention.

The impregnating resin composition was prepared by mixing the following materials at about 100°C.

| | Parts |
|---|---|
| ERRA 4221 (described in Example 61) | 63 |
| ERL 4221 (described in Example 61) | 37 |
| Barium trifluoromethylsulfonate | 0.5 |
| Di(2-methyl-4-pivaloxy-2-pentyl)oxalate | 0.526 |

The glass fiber reinforcement for the tape was continuous glass roving (available from Johns Manville, Inc as JM1950J). A collimated web of 140 ends of this roving was passed through a standard dip tank equipped with squeeze rollers containing the impregnating resin composition heated to 100°C, cooled to room temperature, and wound in a roll. The tape was then cut into sections 12 inches long, and crossply laminates containing seven plies were molded in a laboratory press at 163°C and 177°C using a pressure of 50 psi. The flexural strength of the laminates was measured by ASTM D-790, and the results are given in Table XIII.

TABLE XIII

Flexural Strength of Seven-ply Crossply Laminates

| Press Cure (time/temp.) | Oven Postcure (time/temp.) | Resin Content | Flexural Strength (psi) | | |
|---|---|---|---|---|---|
| | | | 25°C | 121°C | 149°C |
| 1 hr./163°C | 4 hr./163°C | 25.8% | 141,000 | 122,000 | 70,000 |
| 1 hr./177°C | 4 hr./177°C | 26.7% | 131,000 | 122,000 | 82,600 |

EXAMPLES 69 – 83

These examples illustrate the use of a variety of catalyst systems with different epoxy resins. The epoxy resins used in the examples include 1) the cycloaliphatic epoxy resin mixture described in Example 61; 2) a mixture of diglycidyl ethers of bisphenol A, specifically, 60 parts of a liquid diglycidyl ether of bisphenol A having an epoxide equivalent weight of 185–192 (Epon 828) and 40 parts of a solid diglycidyl ether of bisphenol A having an epoxide equivalent weight of 600–700 (Epon 1002 available from Shell Chemical Company); and 3) an epoxy novolac resin, specifically, a polyglycidyl ether of a phenol-formaldehyde novolac, having an epoxide equivalent weight of 176–181 (DEN 438 available from Dow Chemical Company). An acid-generating ester (di(2-methyl-4-acetoxy-2-pentyl)oxalate) was used in all the examples except Examples 69, 72, 76, 78, 80, and 82. Acid-generating ester was omitted from those examples to provide a comparison; in each of those examples, there were no signs of curing, and the test was ended after 15 minutes. The compositions were prepared by heating 225 parts of the epoxy resin named in Table XII to 200°F, and then adding 0.00259 mole of the metal salt named in Table XIV, 0.00259 mole of the acid-generating ester, and 0.00146 mole of any buffering compound. The pot life of the composition was measured as the time after the composition had been prepared and while it was held at 200°F for the viscosity of the composition to exceed either 3000 centipoises (Examples 69–75) or 1000 centipoises (Examples 76–83). The gel time for the composition was measured as the time after mixing of the composition and heating to 325°F. The results are given in Table XIV.

TABLE XIV

| Example No. | Epoxy Resin | Metal Salt | Buffering Compound | Acid-Generating Ester | Gel Time (minutes) | Pot Life (hours) |
|---|---|---|---|---|---|---|
| 69 | Cycloaliphatic epoxy resin | Ca $(CF_3SO_3)_2$ | — | — | >15 | >4 |
| 70 | " | " | — | Included | 3.4 | 2 |
| 71 | " | " | Sod. Stearate | Included | 3.2 | 3 |
| 72 | " | Ba $(CF_3SO_3)_2$ | — | — | >15 | >4 |
| 73 | " | " | — | Included | 3.9 | >4 |
| 74 | " | " | Barium Neodecanoate | Included | 3.6 | >4 |
| 75 | " | " | Sod. Stearate | Included | 4.4 | >4 |
| 76 | Diglycidyl ether of bisphenol A | Ca $(CF_3SO_3)_2$ | — | — | >15 | >4 |
| 77 | " | " | — | Included | 7.4 | >4 |
| 78 | " | Ba $(CF_3SO_3)_2$ | — | — | >15 | >4 |
| 79 | " | " | — | Included | 10.1 | >4 |
| 80 | Epoxy novolac resin | Ca $(CF_3SO_3)_2$ | — | — | >15 | >4 |
| 81 | " | " | — | Included | 5.4 | >4 |
| 82 | " | Ba $(CF_3SO_3)_2$ | — | — | >15 | >4 |
| 83 | " | " | — | Included | 7.4 | >4 |

Example 84

This example shows the use of a catalyst system of the invention to catalyze polymerization of a phenolic resin. In this example 30 parts of benzophenone was melted in a 50-ml Ehrlenmeyer flask and heated to 150°C, after which 10 parts of a phenolic resin as taught in U.S. Pat. No. 3,485,797 having an average molecular weight of about 700 (from Ashland Chemical Company) was added to the flask and the mixture heated to 150°C. Thereupon 0.2 part of barium trifluoromethyl sulfonate, and 0.4 part of di(benzyl-t-butyl)oxylate were added to the flask. The induction period at 120°C was 1-½ minutes and within 2-½ minutes the composition had completely cured. At 100°C the induction period was 9 minutes, and was followed by very slow curing.

What is claimed is:

1. In combination as a catalyst system soluble in the material to be catalyzed, 1) one equivalent of metal salt selected from the group consisting of lithium, sodium, calcium, strontium, silver, barium, and lead salts of a fluoroalkylsulfonyl acid selected from the group consisting of fluoroalkane sulfonic acids and bis(fluoroalkylsulfonyl)-methanes; and 2) about 0.2 to about 2 equivalents of thermally decomposable ester reaction product of a tertiary alkyl alcohol and an acid that forms a chelation complex with the metal cation of said metal salt, the ester reaction product decomposing upon heating to release the chelating acid for complexing with the metal cation, whereby catalytic activity is initiated.

2. A combination of claim 1 in which the metal of said metal salt is selected from the group consisting of lithium, sodium, strontium, and barium.

3. A combination of claim 1 in which the fluoroalkylsulfonyl acid is a fluoroalkane sulfonic acid and the fluoroalkyl group is perfluoroalkyl containing 2 carbons or less.

4. A combination of claim 1 in which the chelating acid is selected from the group consisting of oxalic, phosphoric and phosphorous acids.

5. A combination of claim 1 that further includes up to about 0.6 equivalent per equivalent of said ester reaction product of a buffering compound that has a solubility in the material to be catalyzed of at least 1 part per 1000 parts of the material to be catalyzed, said buffering compound providing a base when dissolved in the material to be catalyzed that associates with the proton of the chelating acid generated by thermal decomposition of said ester reaction product to retard the catalytic activity of the combination.

6. A combination of claim 5 in which the buffering compound is selected from the group consisting of hydroxides, alkoxides, and carboxylates of alkali metals, carboxylates of alkaline-earth metals, and quaternary ammonium hydroxides.

7. A combination of claim 5 in which the buffering compound is selected from the group consisting of carboxylates of barium, strontium and sodium.

8. In combination as a catalyst system soluble in the material to be catalyzed, 1) one equivalent of metal salt selected from the group consisting of lithium, sodium, strontium, and barium salts of a fluoroalkane sulfonic acid; and 2) about 0.2 to about 2 equivalents of thermally decomposable ester reaction product of a tertiary alkyl alcohol and an acid that forms a chelation complex with the metal cation of said metal salt, the ester reaction product decomposiing upon heating to release the chelating acid for complexing with the metal cation, whereby catalytic activity is initiated.

9. A combination of claim 8 in which the chelating acid is selected from the group consisting of oxalic, phosphoric, and phosphorous acids.

10. A combination of claim 8 that further includes up to about 0.6 equivalent per equivalent of said ester reaction product of a buffering compound that has a solubility in the material to be catalyzed of at least 1 part per 100 parts of the material to be catalyzed, said buffering compound providing a base when dissolved in the material to be catalyzed that associates with the proton of the chelating acid generated by thermal decomposition of said ester reaction product to retard the catalytic activity of the combination.

11. In combination as a catalyst system soluble in the material to be catalyzed, 1) one equivalent of barium trifluoromethane sulfonate; and 2) about 0.2 to about 2 equivalents of thermally decomposable ester reaction product of a tertiary alkyl alcohol and an acid selected from the group consisting of oxalic, phosphoric, and phosphorous acids that forms a chelation complex with the barium cation, the ester reaction product decomposing upon heating to release the chelating acid for complexing with the barium cation, whereby catalytic activity is initiated.

12. A combination of claim 11 in which the chelating acid is oxalic acid.

* * * * *

UNITED STATES PATENT AND TRADEMARK OFFICE
CERTIFICATE OF CORRECTION

PATENT NO. : 3,907,706
DATED : Sept. 23, 1975
INVENTOR(S) : Janis Robins

It is certified that error appears in the above-identified patent and that said Letters Patent are hereby corrected as shown below:

In column 3, line 16, add --s-- to "catalyst."

In column 4, line 54, delete [3] after "$(CF_3SO_2)_2$."

In column 4, line 54, insert --$CHCH_3$-- after "$(CF_3SO_2)_2$."

In column 6, line 56, delete [g] before "6 or more..."

In column 15, line 38, "and" should be --that--.

In column 18, line 57, "100" should be --1000--.

In column 18, line 31, "hu-" should be --hy-".

Signed and Sealed this twentieth Day of January 1976

[SEAL]

Attest:

RUTH C. MASON
Attesting Officer

C. MARSHALL DANN
Commissioner of Patents and Trademarks